United States Patent [19]

Fillipo et al.

[11] Patent Number: 5,100,951
[45] Date of Patent: Mar. 31, 1992

[54] STABLE BLENDS OF CATIONIC WATER-IN-OIL EMULSION POLYMERS AND CATIONIC AQUEOUS SOLUTION POLYMERS

[75] Inventors: Bruce K. Fillipo, Dublin; John F. Walko, Furlong; David I. Devore, Langhorne, all of Pa.

[73] Assignee: Betz Laboratories, Inc., Trevose, Pa.

[21] Appl. No.: 248,466

[22] Filed: Sep. 23, 1988

[51] Int. Cl.$^5$ ............................ C08J 3/02; C08K 3/20; C08L 79/00

[52] U.S. Cl. .................................... 524/501; 524/922; 524/801; 524/815

[58] Field of Search ................ 524/501, 922, 815, 801

[56] References Cited

U.S. PATENT DOCUMENTS

| | | |
|---|---|---|
| Re. 28,474 | 7/1974 | Anderson et al. ................ 524/922 |
| Re. 28,807 | 5/1976 | Panzer et al. . |
| Re. 28,808 | 5/1976 | Panzer et al. . |
| 3,624,019 | 11/1971 | Anderson et al. ................ 524/922 |
| 3,691,124 | 9/1972 | Barron . |
| 3,738,945 | 6/1973 | Panzer et al. . |
| 3,806,485 | 4/1974 | Frisque . |
| 3,826,771 | 7/1974 | Anderson et al. . |
| 3,997,492 | 12/1976 | Kane et al. ........................ 260/29.6 |
| 4,077,930 | 3/1978 | Lim et al. ............................ 524/801 |
| 4,374,216 | 2/1983 | Dammann ........................ 524/901 |
| 4,464,508 | 8/1984 | Easterly, Jr. ...................... 524/801 |

*Primary Examiner*—Paul R. Michl
*Assistant Examiner*—Patrick Niland
*Attorney, Agent, or Firm*—Alexander D. Ricci; Philip H. Von Neida

[57] ABSTRACT

Novel, stable blends of cationic water-in-oil emulsion polymers with cationic polymers in aqueous solution are preparable through the use of stabilizing solvents and surfactants.

56 Claims, No Drawings

STABLE BLENDS OF CATIONIC WATER-IN-OIL EMULSION POLYMERS AND CATIONIC AQUEOUS SOLUTION POLYMERS

FIELD OF THE INVENTION

This invention relates to stable blends or combinations of cationic polymers in inverse emulsion form with cationic polymers in aqueous solution.

BACKGROUND OF THE INVENTION

Water-soluble polymers in water-in-oil (inverse) emulsion form, i.e., water-soluble polymer/water as the discrete phase of the emulsion, and hydrocarbon solvent as the continuous phase of the emulsion, have found great utility in water treatment and related industries. The utility of the inverse emulsions is in large measure due to their ability to supply high concentrations of high molecular weight water-soluble polymers in "liquid", free-flowing form. As is well known to those skilled in the art, high molecular weight water-soluble polyelectrolytes are very viscous in solution, and concentrations in water above about 1% are extremely viscous and difficult to pour, pump, etc.

These inverse emulsion products generally comprise approximately equal quantities of hydrocarbon, polymer and water (about 30% of each), together with hydrophobic surfactants for stabilization of the emulsion and hydrophilic surfactants for subsequent inversion into water for use.

In order for these inverse emulsions to be used for various applications, including water-treatment, they generally must be activated by inversion of the emulsion, from a water-in-oil emulsion to an oil-in-water emulsion. This is generally done by diluting the emulsion with water. The self-inverting characteristics of the emulsions which contain the inverting surfactant thus allow the polymer to be "released" into the water, making the polymer available for use. By the same token, the oil phase becomes the discontinuous phase, and what is obtained when the emulsion is diluted with water is a hazy solution of the polymer in water, the haziness being the emulsified oil.

The inversion is generally conducted with sufficient quantities of water such that the polymer will be approximately at use concentration, usually about one percent polymer on an active basis, or less. Thus, one gram of emulsion containing about 30% polymer will require about 33 g of water in order to achieve a one percent solution. As is well known in the art, the polymers contained in the inverse emulsions are generally of high molecular weight, usually greater than one million up to about 20 million or more. For this reason, solutions of these high molecular weight polymers become very viscous above about one percent concentration in water, thus limiting their ability to be pumped, etc. Also for the aforementioned reasons, the inversion must be carefully conducted so that localized regions of high polymer concentration are avoided. Thus, the emulsion is always added to the well stirred aqueous portion.

One consequence of the self-inverting characteristics of the water-in-oil emulsions is that they are "unstable" in the presence of water. Thus, if a small amount of water is inadvertently introduced into the emulsion, the emulsion will invert in the area where the contaminating water is present. Since the polymer concentration in the localized area will tend to be very high, the inverted portion will have an extremely high viscosity, and may even be "gel" like. This results in an unusable portion of polymer which is also objectionable because it will tend to clog transfer lines, pumps, and the like.

The contamination of these emulsions with water is a common occurrence in manufacturing plants, shipping, and in use location, and causes many problems in cleanup, filtration, and lost time. Such contamination can occur through spills, rain falling into open drums and tank trucks, and the like, and has resulted in increased surveillance on the part of personnel to avoid the possibility of contamination. It is thus well known that inverse emulsions of water-soluble polymers are incompatible with significant quantities of water, with the obvious exception of the dilution of the emulsions with such great quantities of water that the polymers will be at their practicable use concentrations (about 1% or less).

It is also known to those in the industry that combination treatments, in various applications, of these high molecular weight water-soluble polymers, in inverse emulsion form, with concentrated aqueous solutions of lower molecular weight polymers can be very useful. Because of the heretofore perceived inability of those skilled in the art to be able to combine the emulsions with the "destabilizing" aqueous solutions, these combinations treatments have always been utilized as dual treatments, i.e., the polymers would be added in separate streams, from separate drums or tanks. In particular, many applications exist where high molecular weight cationic polymers in inverse emulsion form are used in combination with lower molecular weight cationic polymers in concentrated aqueous solution, via dual treatment systems.

SUMMARY OF THE INVENTION

The inventors of the instant invention have surprisingly found that high molecular weight cationic polymers in inverse emulsion form can be combined with aqueous solutions of lower molecular weight cationic polymers to form stable mixtures which are novel and useful. These mixtures comprise a wide range of useful compositions and ratios, which have heretofore been unknown and thought incapable of existing in stable form, i.e., without formation of gels, and with stable viscosities. These combinations are made possible through the use of certain stabilizing surfactants and solvents, to be described later herein. The stabilizing solvents and surfactants are added in surprisingly small amounts to provide the blends with acceptable stability.

Within certain narrow concentrations and ratios, the high molecular weight cationic polymers in inverse emulsion form can be combined with small amounts of the lower molecular weight cationic polymers in aqueous solution without addition of stabilizing agents. Far more useful, however, and the essence of our invention, is the ability to combine the aforementioned cationic emulsion polymers with the aqueous cationic polymers over a wide range of compositions and ratios through the use of stabilizing solvents and surfactants. The use of these stabilizing components allows the formulation of compositions for a great many applications in water and wastewater treatment.

DESCRIPTION OF THE PRIOR ART

Frisque, U.S. Pat. No. 3,806,485, assigned to Nalco Chemical Co., discloses combinations of anionic vinyl addition polymers, in inverse emulsion form, with water soluble cationic polymers. The '485 patent does not contemplate, nor even suggest, that cationic vinyl addition polymers in inverse emulsion form could be mixed with cationic water soluble polymers. The '485 polymer mixtures are inherently unstable, and form highly water insoluble gels when inverted in water. The instant invention produces stable mixtures of cationic polymers in inverse emulsion form with cationic polymers in aqueous solution. Furthermore, when the instant mixtures are "inverted" into water a completely soluble mixture of polymers is the result. The '485 patent does not suggest in any way that stabilizing agents or solvents could be added to the mixtures of anionic emulsion polymer and cationic aqueous polymer. The '485 patent goes so far as to suggest that "self-inverting" emulsions, i.e., emulsions which already contain the inverting surfactants, are unstable and must be carefully formulated or else the emulsion will be destroyed (col. 5, lines 72–75; col. 6, lines 1–3). The instant invention contemplates the use of self-inverting emulsions in combination with cationic polymers in aqueous solution, and provides methods for stabilizing these mixtures. Thus, the '485 patent is not considered relevant to the instant invention.

Barron, U.S. Pat. No. 3,691,124, assigned to Dow Chemical Company, teaches the use of cationic polymers to stabilize inverse emulsions. Close examination of the teachings of this patent reveal that it is not relevant to the instant invention. A key feature is that the '124 polymers which are added to the inverse emulsion polymers are restricted to oil-phase solubility and are added solely to impart additional stability to the emulsions. They are not utilized as components of the active polymer treatments. The '124 stabilizing polymers are restricted to acrylate ester copolymers, and the cationicity is imparted solely through a tertiary amine functionality. No mention of the utility of quaternary ammonium salts is made or suggested. The '124 stabilizing polymers also appear to be limited to about 5 weight percent in quantity.

Anderson, et al., U.S. Pat. No. 3,826,771, disclose the use of higher concentrations of water in the dispersed phase of the inverse emulsion to make the emulsions more stable. This patent is not pertinent to the present invention since '771 does not contemplate mixing aqueous solutions of polymers with the inverse emulsions, and does not contemplate the use of stabilizing solvents and surfactants. Furthermore, water concentration is not a key element to the present invention (except that very high concentrations of water can cause the problems mentioned earlier, namely destabilization of the emulsion).

DETAILED DESCRIPTION OF THE INVENTION

The present inventors discovered that cationic, high molecular weight, water-soluble polymers in water-in-oil emulsion form unexpectedly can be combined with cationic polymers in aqueous solution to give stable blends. The stable blends are obtained through the use of stabilizing surfactants and solvents, which can be added in surprisingly small amounts and still provide stability to the mixtures of cationic inverse emulsion polymers and aqueous cationic polymers.

Further, a stable emulsion blend may be obtained without additional surfactants and solvents when the cationic emulsion polymer and the cationic polymer in aqueous solution are combined in a weight ratio of from about 5 to about 95 percent.

The high molecular weight cationic emulsion polymers which are the subject of the invention are well known to those practicing in the art. The polymers generally comprise acrylamide copolymers produced with a variety of cationic comonomers; e.g., ethylenically unsaturated cationic monomers. The cationic monomers can be either amine containing monomers or quaternary ammonium salt containing monomers as depicted by the following formulas:

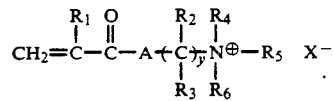

or:

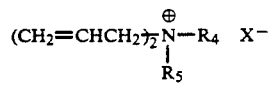

wherein $R_1$ in the above formula represents hydrogen or lower alkyl (e.g., $C_1$–$C_3$); $R_2$ and $R_3$ independently represent hydrogen or hydroxyl; $R_4$, $R_5$, and $R_6$ independently represent lower alkyl (e.g., $C_1$–$C_3$) or benzyl; A represents O or NH; y is 1–5; and X represents chloride or methosulfate.

Typical of the cationic monomers commonly copolymerized with acrylamide are: the aminoalkylacrylate esters and their quaternary ammonium salts (quaternization with such quaternizing agents as methyl chloride, dimethyl sulfate, benzyl chloride and the like); the amonialkylmethacrylate esters and their corresponding quaternary ammonium salts; the aminoalkylacrylamides and their corresponding quaternary ammonium salts; the aminoalkylmethacrylamides and their corresponding quarternary ammonium salts; the diallyldialkylammonium salt monomers; the vinylbenzyltrialkylammonium salts; and the like. Non-limiting examples of the cationic monomers that can be used to prepare the cationic emulsion polymers in our invention are: diallyldimethylammonium chloride; diallyldiethylammonium chloride; acryloyloxyethyltrimethylammonium chloride; methacryloyloxyethyltrimethylammonium chloride; acryloyloxyethyltrimethylammonium methosulphate; methacryloyloxyethyltrimethylammonium methosulphate; acryloyloxyethyldiethylmethylammonium chloride; methacryloyloxyethyldiethylmethylammonium chloride; methacryloyloxyethyldiethylmethylammonium chloride; and, methacryloyloxyethyldiethylmethylammonium chloride. Mixtures of the cationic monomers together with acrylamide to prepare the cationic polymers are also useful for our invention. The instant invention also contemplates homopolymers of the cationic monomers, as well as copolymerization of mixtures of cationic monomers without acrylamide as useful. The above description of useful cationic monomers in no way limits the practice of our invention. Those skilled in the art will be familiar with other cationic monomers which can be used to prepare the cationic, high molecular weight polymers useful in our invention.

The cationic polymers can have a wide range of charge densities, from just a few mole percent of cationic monomer up to 100 mole percent of cationic monomer (homopolymers). The molecular weights of the cationic emulsion polymers are not critical to out invention, but can range from a few hundred thousand to several million. Those in the art recognize that for many of the applications for which these polymers are useful, activity of the polymers will increase as the molecular weights increase.

Preparation of the cationic emulsion polymers is well known and is described in the literature in detail. Typical procedures and methods can be found, for example, in reissued U.S. Pat. No. 3,624,019, reissued as Re. 28,474, herein incorporated by reference. It is important to note that most commercially available inverse emulsion polymers available today contain the inverting surfactant as part of the formulation, and are thus "self-inverting", and our invention prefers, but is not limited to, the use of these self-inverting emulsion polymers.

The cationic aqueous polymers can be any cationic, water-soluble polymer which can be prepared in "substantial" concentration in water. By "substantial" is meant concentrations which are sufficiently high to make preparation and shipping of the polymers in aqueous solution economically practical. Thus, the concentrations of the aqueous cationic polymers can be anywhere from about 10 weight percent to about 90 weight percent, with concentrations from about 20 weight percent to about 75 weight percent being preferred. The worker in the art will recognize that in order for the water soluble polymers to meet the requirement of concentration, the molecular weights will tend to be lower than, but not limited to, those of the cationic, high molecular weight polymers in inverse emulsion form. The polymers comprising the class of cationic polymers in aqueous solution contemplated by our invention includes but is not limited to, both addition polymers, usually prepared by free radical initiation, and the so-called condensation polymers, usually prepared without special initiators. Examples of the types of cationic polymers in aqueous solution which are useful in accordance with the invention include, but are not limited to: polydiallyldimethylammonium salts, including the chloride salt; polydiallyldiethylammonium salts, including the chloride salt; the polyquaternary ammonium salt polymers prepared from epihalohydrins and their precursors reacted with dialkyl amines, with or without small amounts of amines with higher functionality, described in Panzer, et. al., in reissued U.S. Pat. No. 28,807 and 28,808 (reissues of U.S. Pat. No. 3,738,945) herein incorporated by reference; and the like. Descriptions of suitable cationic polymers can be found in the article on "Polyamines and Polyquaternary Ammonium Salts", in the Encyclopedia of Polymer Science and Engineering, Second Edition, John Wiley & Sons, New York, Volume 11, pages 489–507. It is to be understood that our invention is in no way limited by the above descriptions of cationic polymers. Those skilled in the art will recognize other cationic polymers which will be useful in the practice of our invention. Mixtures of cationic aqueous polymers are also contemplated by this invention.

The stabilizing surfactants comprise two types. The first encompasses the hydrophobic, so-called low HLB surfactants which are documented in the literature, and which are described in the Atlas HLB Surfactant Selector, with commercial versions listed in "McCutcheon's Emulsifiers and Surfactants", published by McCutcheon Division, Mc Publishing Co., Glen Rock, N.J. These hydrophobic surfactants generally are soluble in hydrocarbons, and generally are insoluble in water. Those skilled in the art will recognize that these types of surfactants are those used as the emulsifying surfactants for the inverse emulsions. Typical of these surfactants, although not limiting, is sorbitan monooleate, which is sold, in one version, as Span ® 80 by ICI Americas, Inc.

The second type of stabilizing surfactants are the hydrophilic, generally water soluble surfactants. Surfactants of this type are described in reissued U.S. Pat. No 28,474, herein incorporated by reference. Typical, although not limiting, of this class of surfactants are the alkoxylated surfactants, in particular the nonylphenols, having from 5–50 moles of ethoxylation. Preferred for our invention, although not limiting, are the nonylphenols having 9–10 moles of ethoxylation. One version of this preferred surfactant is Surfonic ® N-95, sold by Texaco Chemical Co.

It has been unexpectedly found that the combination of stabilizing"emulsifying" and "inverting" surfactants can be used in total amounts of as little as about 0.5% and still provide activity in stabilizing the blend of cationic inverse emulsion polymer and cationic aqueous polymer. Since the surfactants used in preparing the inverse emulsions and making them self-inverting can amount to as much as about 10% of the total weight of emulsion, it is to be recognized that the additional surfactants used to stabilize the blend of polymers surprisingly can represent a small fraction of the total amount of surfactants present. The maximum amounts of stabilizing surfactants contemplated in our invention is about 10%. In general, the amount of stabilizing surfactants is determined by the quantity of water present in the cationic aqueous polymer, with more dilute solutions requiring higher amounts of surfactants.

The stabilizing solvents used in accordance with the invention are hydrocarbon liquids and can include aliphatic, mixed aliphatic/aromatic, or aromatic solvents. Particularly useful solvents are the aliphatic solvents, with the low odor, low aromatic paraffinic solvents preferred. Non-limiting examples of the preferred solvents are deodorized kerosene and the low odor, low aromatic solvent sold by Exxon as Low Odor Paraffin Solvent (LOPS). Concentrations of stabilizing solvents from about 2% to about 20% of the total formulation are useful, with about 5 to about 10% preferred. As with the stabilizing surfactants, more stabilizing solvent is needed as the water content of the cationic aqueous polymer increases.

The order of addition of ingredients for the formulation can be critical. It is preferred that the order of addition be as follows: cationic inverse emulsion polymer, stabilizing solvent, stabilizing surfactants, cationic aqueous polymer. The aqueous cationic polymer should not be added first in any case, as this usually leads to instability of the formulation. If the concentration of aqueous cationic polymer is less than about 25% of the total, the aqueous polymer could be added to the emulsion polymer before the solvent/surfactants, but this is not desirable. The order of addition of solvent/surfactants to the emulsion is not critical, but preferred is solvent followed by hydrophobic surfactant followed by hydrophilic surfactant. The solvent could be added to the cationic emulsion polymer followed by the cationic aqueous polymer, and then the surfactants, except where the aqueous portion of the cationic aqueous polymer would constitute more than about 25% of the total formulation. By the same token, the order of addition could be cationic inverse emulsion polymer, solvent, hydrophobic surfactant, cationic aqueous polymer, hydrophilic surfactant, but undesirable would be cationic inverse emulsion polymer, solvent, hydrophilic surfactant, cationic aqueous polymer, hydrophobic surfactant. Another undesirable order of addition is cationic inverse emulsion polymer, surfactants, cationic aqueous polymer, solvent.

The invention is further illustrated by the following specific, but non-limiting, examples.

In the following tables, the numbered polymers are identified as follows (all cationic inverse emulsion polymers are self-inverting, i.e., they contain the hydrophilic, inverting surfactant as part of the product):

Polymer 1—Commercial cationic copolymer of acrylamide and acryloyloxyethyldiethylmethylammonium chloride, containing about 8 mole % of the cationic monomer, having a molecular weight in excess of one million, in inverse emulsion form.

Polymer 2—Commercial cationic copolymer of acrylamide and acryloyloxyethyldiethylmethylammonium chloride, containing about 40 mole % of the cationic monomer, having a molecular weight in excess of one million, in inverse emulsion form.

Polymer 3—Commercial cationic copolymer of acrylamide and methacryloyloxyethyldiethylmethylammonium chloride, containing about 7.5 mole % of the cationic monomer, having a molecular weight in excess of one million, in inverse emulsion form.

Polymer 4—Commercial cationic copolymer of dimethylamine and epichlorohydrin, having a molecular weight of about 10,000, in 40% aqueous solution.

Polymer 5—Commercial cationic diallyldimethylammonium chloride polymer, having a molecular weight of about 500,000, in 18% aqueous solution.

All compositions are given in weight percents. The stability ratings are as follows:

1 = stable: equivalent in stability to the "parent" emulsion after six weeks accelerated aging tests, i.e., less than 10% separation, with readily redispersed sludge, when stored at 40 degrees F., ambient, or 122 degrees F. for six weeks. The formulation would also have self-inversion characteristics equivalent to the parent emulsion.

2 = unstable; shear sensitive; viscosity increases significantly with shear

3 = unstable; product separation occurs rapidly

4 = unstable; shear sensitive; viscosity increases significantly with shear; gelled particles observed 5 = unstable; product gelled 6 = unstable; shear sensitive; viscosity increases only slightly with shear The order of addition for these examples is the preferred order of addition; namely, cationic inverse emulsion polymer, stabilizing solvent, stabilizing surfactants, cationic aqueous polymer.

TABLE I

|  | Formulation # | | | |
|---|---|---|---|---|
|  | 1 | 2 | 3 | 4 |
| Polymer 1 | 46.52 | 43.84 | 46.92 | 50.0 |
| Polymer 4 | 46.52 | 43.84 | 46.92 | 50.0 |
| LOPS | 5.36 | 10.72 | 5.36 | — |
| Span 80 | 0.86 | 0.86 | 0.43 | — |
| Surfonic N-95 | 0.74 | 0.74 | 0.37 | — |
| Stability | 1 | 3 | 2 | 2 |

It can be seen from Table I that equal weight blends of the cationic inverse emulsion polymer with the cationic aqueous polymer are unstable without added stabilizers (Formulation 4). For this combination of polymers, it was found that combinations of stabilizing surfactants totaling about 0.8% did not provide adequate stability, whereas levels of combined stabilizing surfactants of about 1.6% provided good stability (Formulation 1 vs. Formulation 3). In addition, for this combination of polymers, too high a level of stabilizing solvent gave an unstable formulation, whereas lower levels of stabilizing solvent provided good stability (Formulation 1 vs. Formulation 3).

TABLE II

|  | Formulation # | | | | | |
|---|---|---|---|---|---|---|
|  | 5 | 6 | 7 | 8 | 9 | 10 |
| Polymer 2 | 46.92 | 49.5 | 50.0 | 49.5 | 49.5 | 47.1 |
| Polymer 4 | 46.92 | 49.5 | 50.0 | 49.5 | 49.5 | 47.1 |
| LOPS | 5.36 | — | — | 5.0 | — | 5.36 |
| Span 80 | 0.43 | 1.0 | — | — | — | 0.44 |
| Surfonic N-95 | 0.37 | — | — | — | 1.0 | — |
| Stability | 1 | 5 | 4 | 2 | 5 | 6 |

For a different combination of cationic polymers, illustrated in Table II, it can again be seen that equal weight blends of the two polymers are unstable (Formulation 7), whereas with the stabilizing solvent and surfactants, an acceptable blend can be formulated (Formulation 5 vs. Formulation 7). It is also illustrated that the solvent or individual surfactants alone do not impart acceptable stability to the blends (Formulations 6, 8, and 9). Formulation 10, prepared without the inverting surfactant, was somewhat more stable than the formulations having a stability rating of "2", and demonstrates that, although the inverting surfactant is added primarily to aid in polymer inversion, it still contributes a minor role to blend stabilization, and thus all three stabilizing components are necessary for optimum product handling characteristics.

TABLE III

|  | Formulation # | | | | | |
|---|---|---|---|---|---|---|
|  | 11 | 12 | 13 | 14 | 15 | 16 |
| Polymer 2 | 45.0 | 46.92 | 46.0 | 44.20 | 20.45 | 25.0 |
| Polymer 5 | 45.0 | 46.92 | 46.0 | 44.20 | 61.35 | 75.0 |
| LOPS | 8.4 | 5.36 | 5.7 | 10.0 | 16.0 | — |
| Span 80 | 0.86 | 0.43 | 1.2 | 0.86 | 1.2 | — |
| Surfonic N-95 | 0.74 | 0.37 | 1.1 | 0.74 | 1.0 | — |
| Stability | 1 | 2 | 2 | 3 | 1 | 5 |

For yet another combination of cationic inverse emulsion polymer and cationic aqueous polymer, it can be seen from Table III that an optimum level of stabilizing solvent (Formulation 11 vs. Formulation 14) and an optimum combination of stabilizing solvent and stabilizing surfactants (Formula 11 vs. Formulations 12 and 13) are required to prepare a stable formulation. It is also demonstrated in Table III that higher ratios of the cationic aqueous polymer in the blend in general require higher levels of stabilizing solvent for stability (Formulation 15 vs. Formulation 11), and that other ratios of the two polymeric components are unstable without the addition of the stabilizing solvent and surfactants (Formulation 16 vs. Formulation 15).

TABLE IV

|  | Formulation # |
|---|---|
|  | 17 |
| Polymer 3 | 67.41 |
| Polymer 4 | 14.44 |
| Polymer 5 | 14.44 |
| LOPS | 3.20 |

TABLE IV-continued

|  | Formulation # 17 |
|---|---|
| Span 80 | 0.26 |
| Surfonic N-95 | 0.22 |
| Stability | 1 |

Table IV illustrates yet another stable combination of cationic inverse emulsion polymer, in this case with a mixture of two cationic aqueous polymers.

Those skilled in the art will recognize the many applications in which these combinations will find utility. Generally the compositions of the invention are used in water treatment particularly for the separation of suspended solids (organic or inorganic), emulsified materials, colloids, make-up, and the like from water. These include, but are not limited to, wastewater treatment applications, influent water clarification, secondary water clarification, oily water waste treatment, papermaking (e.g., fiber retention), protein recovery, emulsion breaking, sludge dewatering, upflow filter clarification, and the like. The polymer combinations of the invention may be used effectively on a product basis at dosages of 0.5 to 100 ppm and preferably 5 to 50 ppm of the system treated. The dosage, of course, is dependent upon the severity of the problem.

Those skilled in the art will also recognize that these materials can also be used in conjunction with other products, such as in water and wastewater applications, with other coagulating agents such as alum, ferric salts, clays, zeolites, activated carbon, and the like.

Field Trial

In order to establish the efficacy of a polymeric blend as provided by the instant invention as compared to the feed of the polymeric materials independently, a product in accordance with the invention was used at a New Hampshire paper facility which required waste sludge dewatering. Initially, separate feeds of an emulsion cationic polymer (Polymer 2 described earlier herein) and cationic polymer in solution (Polymer 4 described earlier herein) were used at separate feed points. Best results using the two feed system were achieved with a 70% feed of Polymer 2 and a 30% Polymer 4 feed.

The blended product utilized in accordance with the present invention comprised a 50/50 blend of Polymer 2 and Polymer 4 with the specific formulation being represented as Formulation 5 of instant specification.

Results utilizing the blended product similar to Formulation 5 of the instant specification were excellent, especially considering that the blended products' ratios were different and feed was at only one point. The blended product (Formulation 5) was fed through Polyblend unit with no aging.

The plant personnel were very impressed for several reasons: namely (1) one product feed, (2) no aging of the product required, (3) one feed point, and (4) the results achieved were just as good as the two feed approach and cost competitive, avoiding the use of handling different containers and the disposing of such. The blended product (Formulation 5) had been made several months prior to use and when used did not require any drum agitation. The product held as a very stable emulsion and as good as any emulsion polymer handled to date by the individual conducting the trial.

Relative to the instantly claimed invention and in the inventors' estimation quite important is a different concept of producing combination polymeric products. In accordance with this particular concept, the first step would involve the emulsification of the liquid polymer product, which requires the addition of oil and surfactants to the most concentrated form of the liquid polymer that was available. The emulsification would be achieved via intense mechanical agitation, such as produced in the laboratory with a Ross Emulsifier or a high-speed impeller. The recommended oil and surfactants are those which are typical of the kind used to make emulsion polymer products such as Betz ® Polymer 1154L, and are preferably identical to those in the commercial emulsion product. Specific examples of oils and surfactants are well known, having been delineated in the literature. The emulsified liquid polymer material would only have to be stable for a brief time period to allow it to be blended with the emulsion polymer product.

The second step entails blending together of the above emulsified liquid polymer product with the commercial emulsion polymer product. This would again require intense mechanical agitation. Emulsification of the liquid polymer would assure that the hydrophobic and hydrophilic components were compatible when it was blended with the commercial emulsion polymer product. That is, the oil phase would remain the predominant, continuous phase, with the aqueous phase (which contains the polymers) dispersed uniformly throughout.

Mixing the liquid polymer product directly into the emulsion product did not result in stable blends. Adding additional oil and surfactants to the emulsion product, and then mixing in the liquid polymer, was an alternative sequence to achieve similar (but not identical) physical conditions to those embodied in this concept. That is, the sequence of additions may have an effect on the stability of the final blend.

Although the concept has been stated specifically for the case of cationic polymers, there is every reason to believe that stable blends of anionic and/or nonionic liquid and emulsion polymers (e.g., a liquid polyacrylate, polymethacrylate, or acrylic acid/1-allyloxy-2-hydroxypropane-3-sulfonic acid, and emulsion polyacrylamide or polyacrylic acid) could be made by the same method.

Having described our invention what is claimed is:

1. Composition of matter comprising a blend of a cationic polymer in water-in-oil emulsion form with at least one different cationic polymer in aqueous solution wherein said cationic polymer in water-in-oil emulsion form and said different cationic polymer in aqueous solution are combined in a weight ratio from about 5 to about 95 percent and said blend does not form gels and maintains stable viscosity.

2. Composition of matter comprising a stable combination of cationic polymer in water-in-oil emulsion form, a different cationic polymer in aqueous solution, hydrocarbon solvent, and hydrophobic and hydrophilic surfactants wherein said combination does not form gels and maintains stable viscosity.

3. Composition according to claim 1, wherein said cationic polymer in water-in-oil emulsion form is a homopolymer of an ethylenically unsaturated cationic monomer, or a copolymer of said cationic monomer with acrylamide or methacrylamide.

4. Composition according to claim 3, wherein said ethylenically unsaturated cationic monomer has the formula:

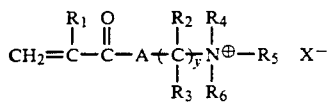

or:

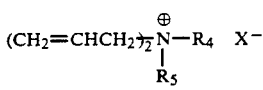

wherein $R_1$ in the above formula represents hydrogen or lower alkyl; $R_2$ and $R_3$ independently represent hydrogen or hydroxyl; $R_4$, $R_5$, and $R_6$ independently represent lower alkyl or benzyl; A represents 0 or NH: y is 1-5; and X represents chloride or methosulfate.

5. Composition according to claim 4, wherein said cationic monomer is acryloyloxyethyltrimethylammonium chloride.

6. Composition according to claim 4, wherein said cationic monomer is acryloyloxyethyltrimethylammonium methosulfate.

7. Composition according to claim 4, wherein said cationic monomer is acryloyloxyethyltrimethylammonium chloride.

8. Composition according to claim 4, wherein said cationic monomer is acryloyloxyethyltrimethylammonium methosulfate.

9. Composition according to claim 4, wherein said cationic monomer is methacryloyloxyethyltrimethylammonium chloride.

10. Composition according to claim 4, wherein said cationic monomer is methacryloyloxyethyltrimethylammonium methosulfate.

11. Composition according to claim 4, wherein said cationic monomer is methacryloyloxyethyltrimethylammonium chloride 12. Composition according to claim 4, wherein said cationic monomer is diallyldimethylammonium chloride.

13. Composition according to claim 4, wherein said ethylenically unsaturated cationic monomer is a mixture of ethylenically unsaturated cationic monomers.

14. Composition according to claim 1, wherein said cationic polymer in aqueous solution is a copolymer of an epihalohydrin with a dialkylamine.

15. Composition according to claim 14, wherein said cationic polymer in aqueous solution is a copolymer of epichlorohydrin and dimethylamine.

16. Composition according to claim 14, wherein said cationic polymer in aqueous solution is polydiallyldimethylammonium chloride.

17. Composition according to claim 14, wherein said cationic polymer in aqueous solution is a terpolymer of epichlorohydrin, dimethylamine, and ethylenediamine.

18. Composition according to claim 3, wherein said copolymer of acrylamide or methacrylamide with said ethylenically unsaturated cationic monomer contains about 0.5 to about 100 mol % of said ethylenically unsaturated cationic monomer.

19. Composition according to claim 18, wherein said mole ratio of ethylenically unsaturated cationic monomer to acrylamide or methacrylamide is about 5 to about 75 mole percent.

20. Composition according to claim 18, wherein said copolymer is a copolymer of acrylamide and said ethylenically unsaturated cationic monomer with a mole ratio of ethylenically unsaturated cationic monomer to acrylamide of about 5 to about 15 mole percent.

21. Composition according to claim 18, wherein said copolymer is a copolymer of acrylamide with said ethylenically unsaturated cationic monomer with a mole ratio of said ethylenically unsaturated monomer to acrylamide of about 30 to about 60 mole percent.

22. Composition according to claim 20, wherein said copolymer is a copolymer of acrylamide and acryloyloxyethyltrimethylammonium chloride having a mole ratio of acryloyloxyethyltrimethylammonium chloride to acrylamide of about 7 to about 10 mole percent.

23. Composition according to claim 21, wherein said copolymer is a copolymer of acrylamide and acryloyloxyethyltrimethylammonium chloride having a mole ratio of acryloyloxyethyltrimethylammonium chloride to acrylamide of about 40 mole percent.

24. Composition according to claim 20, wherein said copolymer is a copolymer of acrylamide and methacryloyloxyethyltrimethylammonium chloride having a mole ratio of methacryloyloxyethyltrimethylammonium chloride to acrylamide of about 6 to about 9 mole percent.

25. Composition according to claim 20, wherein said copolymer is a copolymer of acrylamide and methacryloyloxyethyltrimethylammonium chloride having a mole ratio of methacryloyloxyethyltrimethylammonium chloride to acrylamide of about 40 mole percent.

26. Composition according to claim 20, wherein said copolymer is a copolymer of acrylamide and acryloyloxyethyltrimethylammonium methosulfate having a mole ratio of acryloyloxyethyltrimethylammonium methosulfate to acrylamide of about 7 to about 10 mole percent.

27. Composition according to claim 20, wherein said copolymer is a copolymer of acrylamide and acryloyloxyethyltrimethylammonium methosulfate having a mole ratio of acryloyloxyethyltrimethylammonium methosulfate to acrylamide of about 40 mole percent.

28. Composition according to claim 20, wherein said copolymer is a copolymer of acrylamide and methacryloyloxyethyltrimethylammonium methosulfate having a mole ratio of methacryloyloxyethyltrimethylammonium methosulfate to acrylamide of about 6 to about 9 mole percent.

29. Composition according to claim 20, wherein said copolymer is a copolymer of methacryloyloxyethyltrimethylammonium methosulfate having a mole ratio of methacryloyloxyethyltrimethylammonium methosulfate to acrylamide of about 40 mole percent.

30. Composition according to claim 1, wherein said cationic polymer in water-in-oil emulsion form has a molecular weight of about 500,000 to about 100,000,000.

31. Composition according to claim 1, wherein said cationic polymer in aqueous solution has a molecular weight of from about 5,000 to about 5,000,000.

32. Composition according to claim 2, wherein aid solvent is comprised of a hydrocarbon or a mixture of hydrocarbons.

33. Composition according to claim 32, wherein said hydrocarbon is an aliphatic hydrocarbon liquid.

34. Composition according to claim 32, wherein said hydrocarbon is a blend of aliphatic hydrocarbon compounds and aromatic hydrocarbon compounds.

35. Composition according to claim 33, wherein said aliphatic hydrocarbon liquid is an isoparaffinic solvent.

36. Composition according to claim 33, wherein said aliphatic hydrocarbon liquid is a deodorized kerosene.

37. Composition according to claim 33, wherein said aliphatic hydrocarbon liquid is a low odor paraffinic solvent.

38. Composition according to claim 33, wherein said hydrocarbon is an aromatic hydrocarbon liquid.

39. Composition according to claim 2, wherein said surfactants are comprised of hydrophobic surfactants and hydrophilic surfactants.

40. Composition according to claim 39, wherein said hydrophobic surfactant is oil soluble.

41. Composition according to claim 40, wherein said hydrophobic surfactant is sorbitan monooleate.

42. Composition according to claim 39, wherein said hydrophilic surfactant is water soluble.

43. Composition according to claim 42, wherein said surfactant is an alkoxylated alkyl phenol.

44. Composition according to claim 43, wherein said surfactant is an ethoxylated alkyl phenol.

45. Composition according to claim 43, wherein said surfactant is an ethoxylated nonyl phenol.

46. Composition according to claim 43, wherein said surfactant is an ethoxylated octyl phenol.

47. Composition according to claim 44, wherein said surfactant is an ethoxylated alkyl phenol having from about 5 to about 50 moles of ethoxylation.

48. Composition according to claim 44, wherein said surfactant is an ethoxylated alkyl phenol having from about 5 to about 20 moles of ethoxylation.

49. Composition according to claim 44, wherein said surfactant is an ethoxylated alkyl phenol having from about 8 to about 12 moles of ethoxylation.

50. Composition according to claim 45, wherein said surfactant is an ethoxylated nonyl phenol having from about =to about 50 moles of ethoxylation.

51. Composition according to claim 45, wherein said surfactant is an ethoxylated nonyl phenol having from about 5 to about 20 moles of ethoxylation.

52. Composition according to claim 45, wherein said surfactant is an ethoxylated nonyl phenol having from about 8 to about 12 moles of ethoxylation.

53. Composition according to claim 32, wherein said solvent is added to the blend of cationic water-in-oil emulsion polymer and cationic aqueous polymer at about 1 to about 20 weight percent.

54. Composition according to claim 39, wherein said surfactants are added to the blend of cationic water-in-oil emulsion polymer and cationic aqueous polymer at about 0.1 to about 20 weight percent.

55. Composition according to claim 2, wherein the preferred order of addition is cationic polymer in water-in-oil form, hydrocarbon solvent, hydrophobic and hydrophilic surfactants, cationic polymer in aqueous solution.

56. Composition of matter comprising a combination of cationic polymer in water-in-oil emulsion form, cationic polymer in aqueous solution, hydrocarbon solvent and hydrophobic and hydrophilic surfactants wherein said cationic polymer in water-in-oil emulsion form ranges from about 20 to about 90 weight percent; said cationic aqueous polymer ranges from about 10 to about 90 weight percent; said hydrocarbon solvent ranges from about 2 to about 20 weight percent and said hydrophobic and hydrophilic surfactants range from about 0.5 to about 10.0 weight percent.

* * * * *